Figure 1:
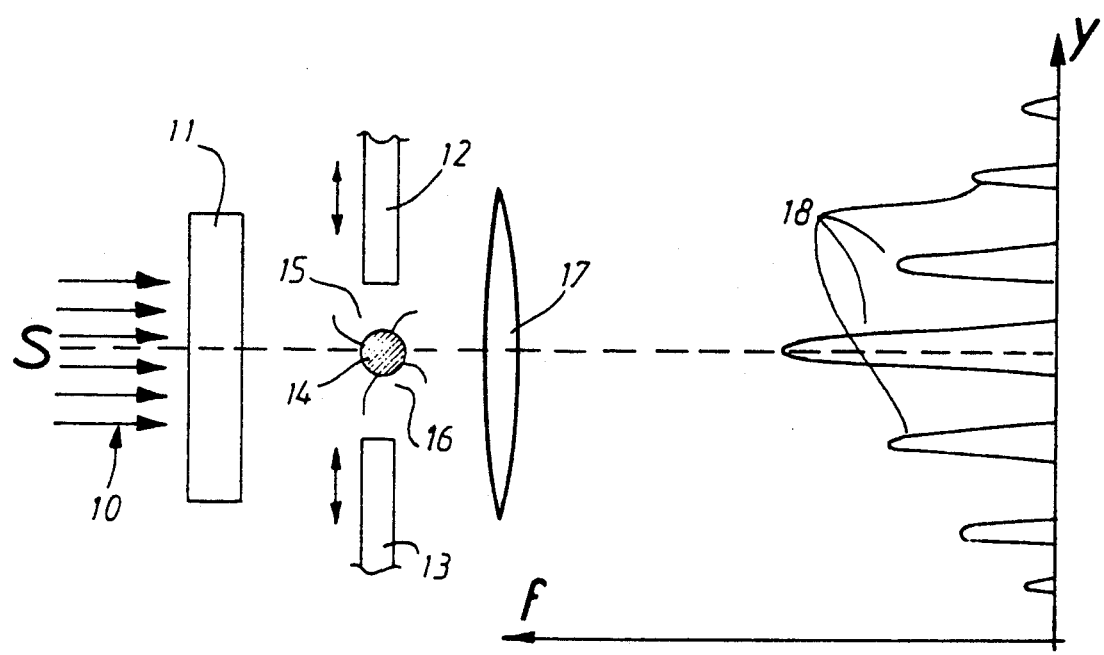

United States Patent [19]

Durand

[11] Patent Number: 5,223,912

[45] Date of Patent: Jun. 29, 1993

[54] METHOD AND DEVICE FOR MEASURING AT LEAST ONE TRANSVERSE DIMENSION OF A TEXTILE YARN

[75] Inventor: Bernard Durand, Pfastatt, France

[73] Assignee: Passap Knitting Machines Inc., Salt Lake City, Utah

[21] Appl. No.: 768,934

[22] PCT Filed: Feb. 5, 1991

[86] PCT No.: PCT/FR91/00077

§ 371 Date: Oct. 15, 1991

§ 102(e) Date: Oct. 15, 1991

[87] PCT Pub. No.: WO91/12488

PCT Pub. Date: Aug. 22, 1991

[30] Foreign Application Priority Data

Feb. 6, 1990 [FR] France .................. 90 01494

[51] Int. Cl.⁵ ............................... G01B 9/02
[52] U.S. Cl. ...................... 356/355; 356/238; 356/384
[58] Field of Search ............ 356/354, 355, 384, 73.1, 356/238, 385, 386

[56] References Cited

U.S. PATENT DOCUMENTS

| | | |
|---|---|---|
| 3,518,007 | 6/1970 | Ito . |
| 3,709,610 | 1/1973 | Kruegle .................. 356/355 |
| 3,937,580 | 2/1976 | Kasdan ................... 356/384 |

FOREIGN PATENT DOCUMENTS

| | | |
|---|---|---|
| 2448651 | 4/1975 | Fed. Rep. of Germany ...... 356/384 |
| 256752 | 12/1985 | Fed. Rep. of Germany . |
| 521456 | 10/1976 | U.S.S.R. ...................... 356/355 |
| 2110364 | 1/1981 | United Kingdom . |

*Primary Examiner*—Samuel A. Turner
*Attorney, Agent, or Firm*—Davis, Bujold & Streck

[57] ABSTRACT

A method and device for measuring at least one transverse dimension of a textile yarn using an optical system. The measuring device comprises a coherent light source which sends a beam (10) onto a cylindrical lens (11). Two axially movable plates (12, 13) are located on opposite sides of the yarn (14) and define two identical slots (15, 16) to form two secondary sources which are arranged to interfere with the coherent light source directed at a lens (17). The transverse dimension of the yarn is deduced from the spacing between the bands (18) of the resulting interference pattern.

4 Claims, 2 Drawing Sheets

METHOD AND DEVICE FOR MEASURING AT LEAST ONE TRANSVERSE DIMENSION OF A TEXTILE YARN

The present invention concerns a method for measuring at least one transverse dimension of a textile yarn, in which the yarn is lit up by means of at least one beam of light emitted by a coherent light source, the interference pattern obtained in the focal plane of an optical system is examined and the said transverse dimension is deduced from the distance separating the interference bands.

It also concerns a device for measuring at least one transverse dimension of a textile yarn, in which the yarn is lit up by means of at least one beam of light emitted by a coherent light source, the interference pattern obtained in the focal plane of an optical system is examined and the said transverse dimension is deduced from the distance separating the interference bands, for the application of the method outlined above.

The known methods which carry out an analysis of the diffraction spectrum in the focal plane of an optical system have several drawbacks. Depending on the dimensions of the yarns measured, the interference bands are further apart or closer together, so that depending on the type of yarn analysed the sensitivity varies. Consequently, if the device is not designed for a very specific type of yarn, the precision of the measurement will be affected. Moreover, the known devices do not provide any information about the shape of the yarn, i.e. about the geometry of its cross-section which can be circular, more or less oval, or even almost rectangular, if the yarn is shaped like a flat or twisted ribbon.

The present invention proposes to offset these various drawbacks by creating a method and a device which are adapted for measuring the transverse dimensions of a yarn, whatever the type of yarn examined, and which enable information to be deduced about the geometrical shape of the cross-section of this yarn.

With this aim, the method according to the invention is characterized in that at least two slots are made, one on either side of the yarn, symmetrical in relation to the yarn, to form two secondary sources arranged to interfere, and in that the said transverse dimension is deduced from the spacing between the bands of the resulting interference pattern.

According to a preferred method, the width of the said symmetrical slots is regulated according to the proportions of the said transverse dimension of the yarn.

According to a particularly advantageous variant, two pairs of slots are made, one pair on either side of the yarn, symmetrical in relation to this yarn and perpendicular two by two, the first pair of slots is lit up by means of a first coherent light beam and the second pair of slots by means of a second coherent light beam, these two beams being perpendicular one to the other, and the transverse dimensions of the yarn in two perpendicular directions are deduced from the interference patterns formed respectively by the slots of the first pair of slots and by those of the second pair of slots.

With this same aim, the device according to the invention is characterized in that it comprises means for making at least two slots, symmetrical in relation to this yarn to form two secondary sources arranged to interfere, means for analysing the resulting interference pattern and means for deducing the said transverse dimension of the yarn from the spacing between the bands of the interference pattern.

The width of the slots is preferably adjustable so that the device can be adapted for analysing different types of yarns.

According to a preferred embodiment, the device comprises two pairs of slots symmetrical in relation to the yarn and perpendicular two by two, means for generating two coherent light beams perpendicular one to the other and respectively perpendicular to the two pairs of slots, means for analysing the resulting interference patterns and means for deducing from these patterns the transverse dimensions of the yarn according to two directions perpendicular to the axis of this yarn and perpendicular to each other.

Figure 2:
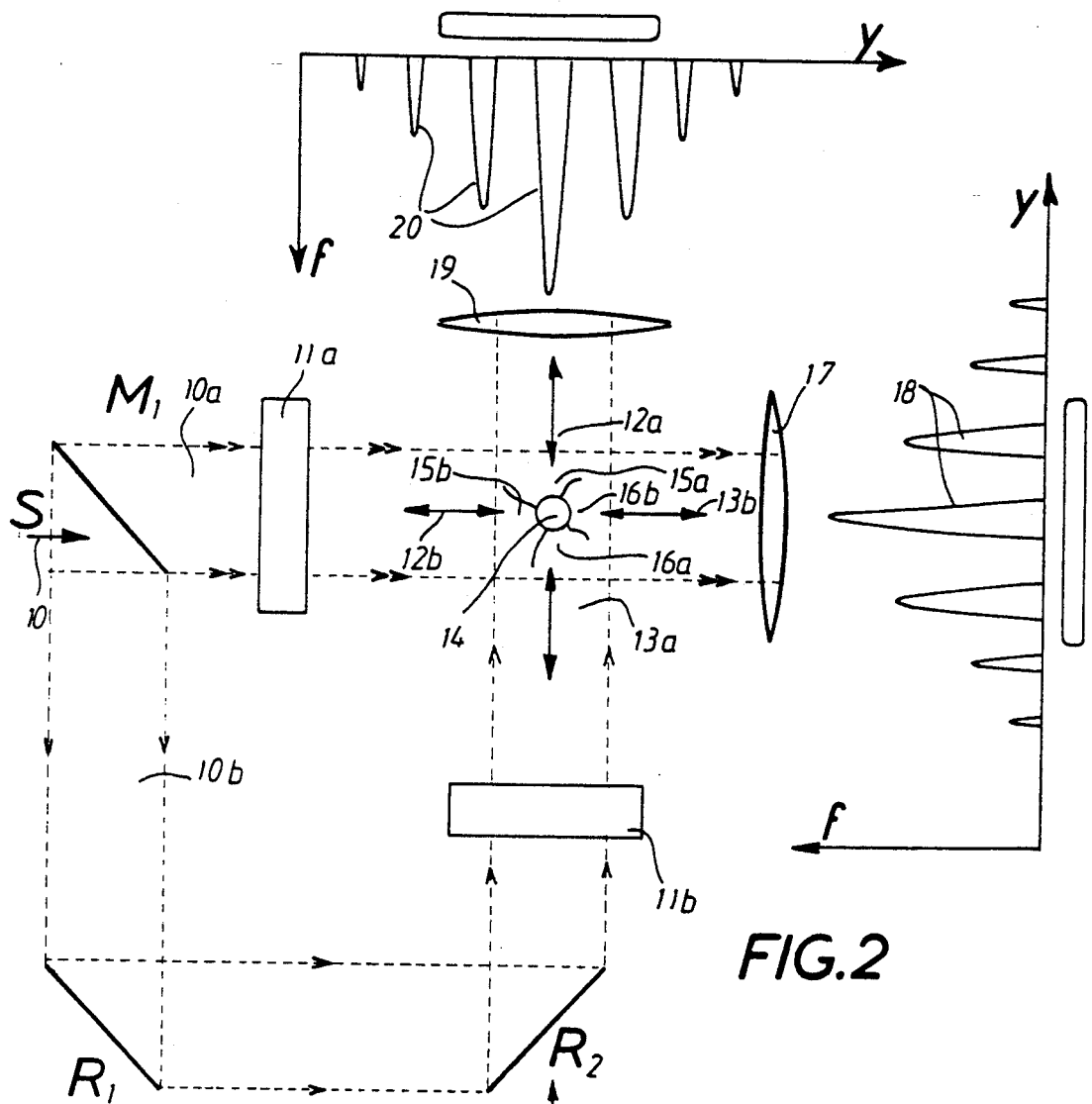
Figure 3:
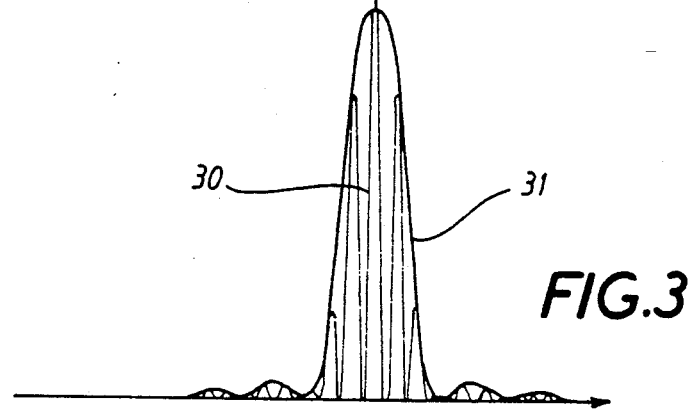

The present invention can be better understood by referring to the description of a preferred embodiment and to the annexed drawing in which:

FIG. 1 shows a schematic view of the device for measuring one transverse dimension of a yarn, FIG. 2 shows a schematic view of the device for measuring two transverse dimensions of the yarn according to two perpendicular axes, and FIG. 3 shows a particular form of the resulting interference images.

With reference to FIG. 1, the measuring device essentially comprises a coherent light source S which emits a beam 10 onto a cylindrical lens 11. It also comprises two axially movable plates 12 and 13 which are located on either side of a yarn 14 of which the measurement of at least one transverse dimension is to be taken. These two plates 12 and 13 are set out symmetrical on either side of the yarn 14 so as to define two identical slots 15 and 16. These two slots become two secondary sources emitting light in the direction of a lens 17 and form in the plane of this lens an interference pattern which is schematically shown in coordinates Y, f (where Y represents the spacing between the interference bands 18 and f the amplitude of these bands).

According to the geometrical quality of the yarn 14, the alternately shiny and dark bands are more or less well-defined, but their frequency depends on the inverse of the distance separating the two slots 15 and 16 i.e. on the diameter of the yarn 14. These interference bands are theoretically more or less spaced out depending on the diameter of the yarn. The fact of fitting two adjustable plates 12 and 13 enables slots of the appropriate width to be made on either side of the yarn, whatever the diameter of this yarn, i.e. enables the sensitivity of the measuring device to be adapted to the type of yarn analysed by simply adjusting the spacing between the plates 12 and 13. This spacing can be real when the spacing of the slots is modified or virtual when an optical system is interposed which enables two virtual secondary sources to be created from the slots.

The device according to FIG. 1 enables information to be obtained corresponding to one transverse dimension of the yarn. To obtain more precise information about the geometry of this yarn, it is indispensable to be able to have information relating to the transverse dimensions of the yarn according to two directions, preferably perpendicular. This information can be obtained by means of the device according to FIG. 2.

As previously, this device comprises a source of light arranged to emit a coherent light beam 10. This beam is sent onto a semitransparent mirror $M_1$ which divides it into a beam 10a and a beam 10b. The beam 10a corresponds to the beam 10 of FIG. 1 and is sent onto a cylindrical focusing lens 11a identical to the lens 11 of the apparatus of FIG. 1. The beam emerging from this lens is directed onto the yarn 14 to be analysed and onto two plates 12a and 13a located on either side of the yarn 14 and arranged to define two slots 15a and 16a identical to the slots 15 and 16 of the preceding apparatus. In this representation, the plates 12a and 13a are shown by double arrows to indicate that they are axially movable in two opposite directions. It will be noted moreover, that the movements of the plates are synchronised given that the slots must be perfectly symmetrical in relation to the yarn. As previously, the slots 15a and 16a constitute secondary sources which form through the lens 17 an interference pattern in the plane of this lens. This interference pattern comprises interference bands 18 identical to the bands produced in the context of the apparatus of FIG. 1.

The divided beam 10b is sent onto a reflector $R_1$ located at 45° which transmits the reflected beam onto a second reflector $R_2$ also located at 45° to transmit it finally onto a cylindrical lens 11b identical to the lens 11a. This lens focuses the beam on the yarn 14 and on two axially movable plates, respective 12b and 13b which define two symmetrical slots 15b and 16b, one on either side of the yarn. These slots constitute as previously, secondary sources which emit light onto a lens 19 forming in its plane interference bands 20.

Thanks to this apparatus, information is obtained about the transverse dimensions of the yarn according to two perpendicular directions.

With reference to FIG. 3, the resulting interference pattern is made up of a set of Young bands 30 which are contained inside an envelope 31. If a represents the distance between the slots, b the distance between the yarn and the edge of the plates, c the width of the slot of the device, d the diameter of the yarn, s the distance between the slot and the focusing lens, λ the wavelength of the light, the interband Δy is given by:

$$\Delta y \; S\lambda/a \cdot S\lambda/d + b$$

which gives if $\frac{S\lambda}{b} = k_1$ $$d = \frac{S\lambda}{\Delta y - k_1}$$

The envelope curve can also be taken into consideration and in this case:

$$\Delta y = S\lambda/b \cdot 7S/c - d$$

which gives if $\frac{2S}{c} = k_2$ $$d = \frac{S\lambda}{k_2 - \Delta y}$$

The present invention is not limited to the embodiments described but may undergo various modifications obvious for somebody in the profession.

I claim:

1. In a method for measuring at least one transverse dimension of a textile yarn, in which the textile yarn to be measured is illuminated by at least one beam of light emitted by a coherent light source and an interference pattern obtained on a focal plane of an optical system is examined whereby the transverse dimension of the textile yarn to be measured is deduced from a spacing between bands of a resulting interference pattern, the improvement comprising the steps of:

forming at least a first pair of variable slots, one variable slot of said at least first pair of variable slots being formed adjacent each of two opposed sides of the textile yarn to be measured, said at least first pair of variable slots being symmetrical in relation to the textile yarn to be measured and forming two secondary sources arranged to interfere with the beam of emitted light, varying the width of said at least first pair of variable slots according to the proportions of the transverse dimension of the yarn, and deducing the transverse dimension of the textile yarn to be measured from the spacing between the bands of the resulting interference pattern.

2. In a method according to claim 1, further comprising the steps of:

employing a second pair of variable slots lying in a second plane with said first pair of variable slots lying in a first plane, the first plane being perpendicular to the second plane and each of said first and second pairs of variable slots being symmetrical in relation to the textile yarn to be measured, illuminating said first pair of slots with a first coherent light beam and illuminating said second pair of slots with a second coherent light beam, the first and second light beams being perpendicular to one another as the coherent light beams illuminate the textile yarn to be measured, and deducing the transverse dimension of the textile yarn to be measured from the interference patterns formed by the textile yarn to be measured and said first and second pair of variable slots.

3. In a device for measuring at least one transverse dimension of a textile yarn, in which the textile yarn to be measured is illuminated by at least one beam of light emitted by a coherent light source and an interference pattern obtained on a focal plane of an optical system is examined whereby the transverse dimension of the textile yarn to be measured is deduced from the spacing between bands of a resulting interference pattern, the improvement wherein said device comprises means for forming at least a first pair of variable slots (15, 16), one variable slot of said at least first pair of variable slots being formed adjacent each of two opposed sides of the textile yarn to be measured and being symmetrical in relation to the textile yarn to be measured, said at least first pair of variable slots forming two secondary sources arranged to interfere with the beam of emitted light, means for varying the width of said at least first pair of variable slots according to the proportions of the transverse dimension of the yarn, means for analyzing the resulting interference pattern, and means for deducing the transverse dimension of the yarn from the spacing between the bands (18) of the resulting interference pattern and the width of said at least first pair of variable slots.

4. In a device according to claim 3, wherein said device further comprises a second pair of variable slots lying in a second plane with said first pair of variable slots lying in a first plane, the first plane being perpendicular to the second plane and each of said first and second pair of variable slots being symmetrical in relation to the textile yarn to be measured, means for illuminating said first pair of slots with a first coherent light beam and illuminating said second pair of slots with a second coherent light beam, the first and second light beams being perpendicular to one another as the coherent light beams illuminate the textile yarn to be measured, means for analyzing the resulting interference patterns, and means for deducing the transverse dimensions of the yarn to be measured from the resulting interference patterns according to two directions, the two directions being perpendicular to an axis defined by the yarn to be measured and perpendicular to one another.

* * * * *